United States Patent
Fischbach

[11] Patent Number: 5,850,778
[45] Date of Patent: Dec. 22, 1998

[54] PRESSURE INDICATOR

[75] Inventor: Wolfgang Fischbach, Daaden, Germany

[73] Assignee: Heinrich Baumgarten KG, Neunkirchen, Germany

[21] Appl. No.: 894,075

[22] PCT Filed: Jan. 24, 1996

[86] PCT No.: PCT/EP96/00285

§ 371 Date: Jul. 24, 1997

§ 102(e) Date: Jul. 24, 1997

[87] PCT Pub. No.: WO96/22717

PCT Pub. Date: Aug. 1, 1996

[30] Foreign Application Priority Data

Jan. 25, 1995 [DE] Germany .......... 295 01 112.2

[51] Int. Cl.⁶ .......... A47J 27/00; A47J 27/092
[52] U.S. Cl. .......... 99/342; 73/706; 73/715; 99/492; 220/316
[58] Field of Search .......... 99/337, 338, 342, 99/330, 331, 492; 73/706, 714, 715; 126/369, 389, 20; 220/316, 319, 315, 334, 303, 203.04; D7/396

[56] References Cited

U.S. PATENT DOCUMENTS

| | | | |
|---|---|---|---|
| 3,494,198 | 2/1970 | Kaminky et al. | 73/715 |
| 3,683,703 | 8/1972 | Lilljeforss | 73/713 |
| 3,818,819 | 6/1974 | Shulz et al. | 99/330 |
| 3,823,657 | 7/1974 | Luetolf | 99/337 |
| 4,169,388 | 10/1979 | Teitelbaum et al. | 73/714 |
| 4,433,579 | 2/1984 | Horn | 73/715 |
| 4,685,336 | 8/1987 | Lee | 73/715 |
| 4,911,068 | 3/1990 | Koether et al. | 99/403 X |
| 4,932,550 | 6/1990 | Moucha | 99/403 X |

*Primary Examiner*—Timothy F. Simone
*Attorney, Agent, or Firm*—Flynn, Thiel, Boutell & Tanis, P.C.

[57] ABSTRACT

Cookers working with an increasing internal pressure require a pressure indicator which can also adjust the internal pressure to a certain extent and, especially in the event of excessively high internal pressure, to release it by pressure equalization with the environment. Such pressure indicators consist of many parts and are complicated and not easily handlable for cleaning purposes. The invention proposes a pressure indicator which may consist of only a single component (2) besides the pressure indicator pin (1), being made of an elastic material and is multifunctional.

18 Claims, 3 Drawing Sheets

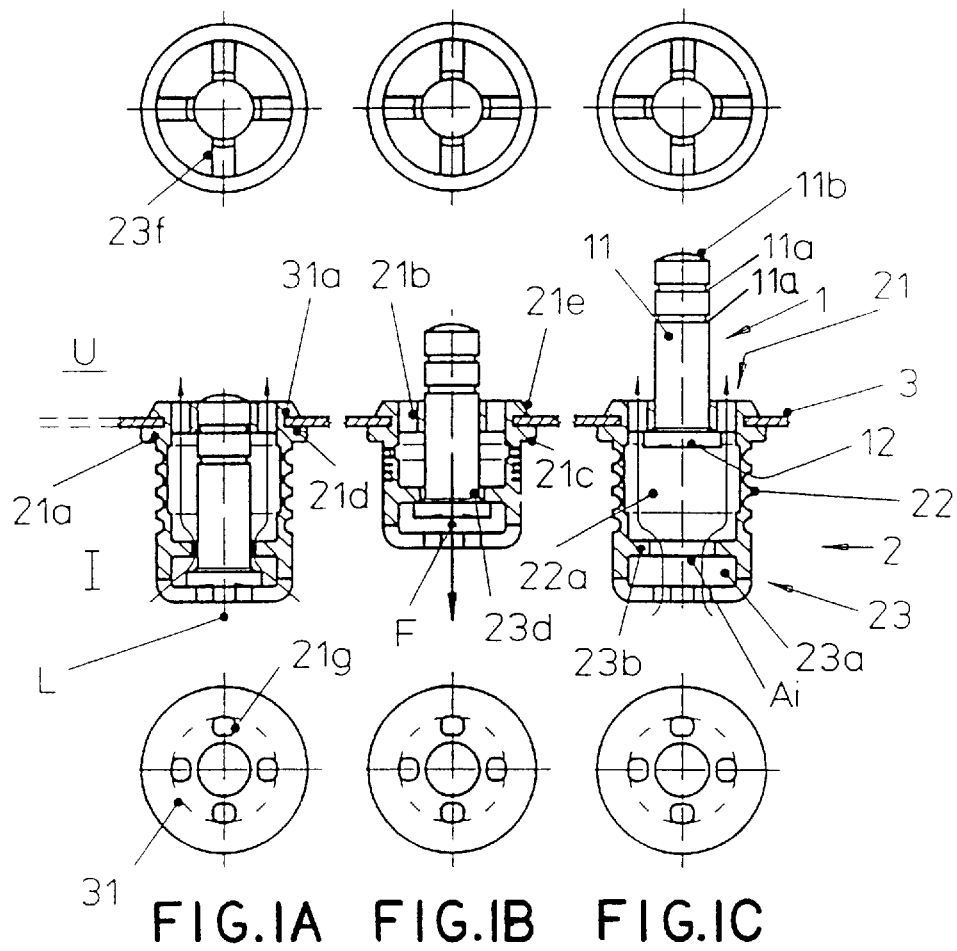
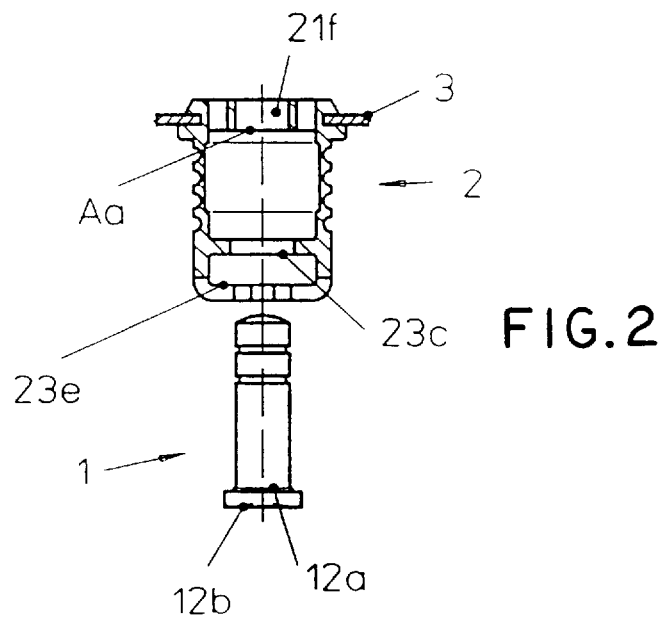

PRESSURE INDICATOR

FIELD OF THE INVENTION

The invention relates to a pressure indicator for a cooking utensil or the like, for example a steam-pressure cooker, having an indicator pin. More specifically, the indicator pin is arranged longitudinally movably in a holding piece, the holding piece is assembled out of a fastening piece, a pipe section projecting from the fastening piece, and a front piece closing off the pipe section. The indicator pin consists of a shaft and a control flange and is supported in a front wall in the fastening piece, which front wall serves as the outer stop, and furthermore is received in the front piece in a rear front wall serving as the inner stop. The front walls have openings, which are either closed off by the contacting control flange or not influenced by the control flange. The rear front wall is designed elastically and the inner stop can be overcome in both directions by the control flange and a stroke limiter for the control flange is provided on the front piece.

BACKGROUND OF THE INVENTION

Such a pressure indicator is known, for example, from DE-A-30 27 057. This pressure indicator is merely capable of indicating whether an excess pressure exists in the cooker or whether the cooker is without pressure. However, this conventional safety valve is not suited as a pressure indicator, which can be used for cooking.

Furthermore, pressure indicators are needed to indicate how high the pressure presently is in the steam-pressure cooker. Such a pressure indicator has, in a conventional manner, an indicator pin in a hole in the utensil wall of the cooking utensil, in particular in the lid, which indicator pin can be axially adjusted against a restoring force, whereby the indicator pin can be moved such that it is driven out of the cooking utensil upon an increase in the pressure so that the length of the indicator pin above the utensil wall indicates the pressure in the cooking utensil.

Pressure indicators of this general type have been known for a long time and are extensively used. Several mostly colored grooves are, as a rule, provided on the indicator pin, which grooves are, if necessary, associated with varying restoring forces, and which grooves are used to observe the pressure. Such a pressure indicator consists of several metallic individual parts and associated rubber-elastic sealing elements. Even though the metal parts are, aside from the restoring spring, turned parts, which can be manufactured by machining in automated machines, the expense of the manufacture and the assembly of such a pressure indicator is considerable. The metal parts must be physiologically safe and must consist of a suitable, mostly surface-refined material so that the cost of the manufacture of the pressure indicator is further increased.

These pressure indicators are not only used to indicate the pressure inside of the cooking utensil but, to a certain degree, also to make the cooking utensil secure by indicating a non-permissible exceeding of pressure during the cooking operation. Venting is also desired at the start of operating the cooking utensil in order to replace the air above the material to be cooked with steam until the operating pressure of the cooking utensil is approximately achieved.

The conventional pressure indicators are mostly installed in a safety valve and are difficult to clean and to service. In most cases, they must be disassembled into their individual parts for these purposes, fitting tools and mechanical skills are needed.

SUMMARY OF THE INVENTION

The purpose of the invention is to provide a pressure indicator of the type described in detail above which is less expensive and is constructed very simply and is user friendly.

The purpose is attained according to the invention in such a manner that the indicator pin is arranged in a holding piece, furthermore the holding piece is assembled as a fastening piece, a longitudinally elastic pipe section projecting from said fastening piece, and a front piece closing off the pipe section. Furthermore, the indicator pin consists of a shaft and a control flange, and is supported in a front wall in the fastening piece. The front wall serves as the outer stop. Finally, the indicator pin is supported in a front piece in a rear front wall serving as the inner stop, whereby the front walls have openings, which are either closed off or not influenced by the contacting control flange. Furthermore, the rear front wall is designed elastically and the inner stop can be overcome in both directions by the control flange. A stroke limiter for the control flange is provided on the front piece.

Aside from the indicator pin, the pressure indicator thus consists in the most advantageous case yet of only one individual holding piece, the elasticity of which is sufficient in order to be able to fasten it without additional structural elements, as for example a screw connection or the like, on the utensil wall, to drive the indicator pin through the rear front wall until the control flange rests on the outer stop upon an overload from the internal pressure of the cooking utensil, and also to manually return the indicator pin in the opposite direction, again by overcoming the rear front wall, into its previous operating position. As will yet be shown, it is furthermore possible without any difficulties to change the indicator pin on the holding piece, which remains in situ, without that this would require a tool or special skill.

The necessary contraction of the pipe section can be achieved in a simple manner, when same is designed as a corrugated pipe coaxially surrounding the indicator pin. The pipe section consists advantageously of such a material and is dimensioned such that it resists axial shortening with a deforming resistance acting as a restoring force. The pipe section itself acts as the restoring spring in such a design, as it is always needed in a mechanical pressure-regulating valve, which pipe section operates the pressure indicator during the cooking process.

Instead it may also be advisable to provide a restoring spring clamped between the fastening piece and the front piece as a separate structural element for producing the restoring force. It is advantageously arranged coaxially with respect to the pipe section and can be provided both above the pipe section and also within the pipe section so that it is in both cases subjected to a cylindrical guiding, which can be further improved when a guide flange for the restoring spring is provided on the fastening piece and/or the front piece so that its ends at both sides are radially locked. It can be advantageous hereby when the pipe section is manufactured separately from the fastening piece and/or the front piece. However, it can also be easily designed such that the restoring spring is during the manufacture of the holding piece integrated into said holding piece so that a single functional element is created. In any case, the design is such that the holding piece including the restoring spring form a building component, which cannot be disassembled so that it does not differ functionally from the previous mentioned design.

It is advantageous when the restoring spring is constructed as a circular-cylindrical metallic coil spring.

The pressure indicator can be easily secured in the utensil wall when the fastening piece is elastically designed and when a circular annular groove is recessed into an outer periphery of the fastening piece to sealingly cover the edge of the hole in the utensil wall. The elasticity of the material of the holding piece makes it possible to press the fastening piece easily into the hole until the annular groove engages the edge of the hole. It is also a guarantee for the connection of the holding piece to the utensil wall being sufficiently tight even with an increasing pressure inside of the cooking utensil, the sealing force rises accordingly so that the sealing action increases further. A separate seal is therefore not needed in the arrangement of the invention. It may be offered to merely provide in a common structural design, a feed cone, on the fastening piece in order to make feeding of the holding piece into the hole easier.

The steam-outlet openings in the front wall of the holding piece can be designed as several through bores distributed on a disk and arranged such that they guarantee even when the control flange rests on the outer stop and the flange closes off the shaft, the flow connection between the inside of the pipe piece and the environment. Thus, the continuous flow connection between the inside of the pipe section and the environment exists independent of the position of the indicator pin and its control flange. When the flow connection is provided on the front wall, the inside of the cooking utensil is therefore also flow-connected to the environment because the openings in the rear front wall then remain open. A nonpermissibly high pressure inside of the cooking utensil is in this manner not only indicated by the indicator pin, which has been driven out to a great extent, but the pressure is at the same time also reduced.

In a particularly preferred embodiment of the pressure indicator of the invention, the control chamber of the front piece is surrounded on the front side by the rear front wall of the holding piece and a stroke limiter for the indicator pin. The stroke limiter is connected to the pipe section, whereby the stroke limiter can be formed out of several holding bars distributed over the periphery of the pipe section and connected thereto. The holding bars are contacted by the control flange. The holding bars are directed radially with respect to the longitudinal axis of the pressure indicator and end freely in a simple and advantageous construction.

The indicator pin can therefore be moved between the contact of an end surface of its control flange on the holding bars and one of the annular flange surface of he control flange, which annular flange surface is oppositely directed to the end surface. Whereby in the first case, as already discussed, the inside of the cooking utensil is flow-connected to the environment, for example at the start of the cooking process or with the indicator pin being manually operated against the pressure inside of the cooking utensil, while the other position is assumed during the entire cooking process, whereby the inside of the cooking utensil remains separated with respect to flow from the environment unless the indicator pin rests through excess pressure with its control flange on the front wall. The holding bars make it possible to press the control flange of the indicator pin, with the cooking utensil being open, through the stroke limiter so that the pin can be removed.

It is advantageous when a bearing bore for the indicator pin is provided in the rear front wall in such a manner that the bearing clearance serving as the second flow opening connects the inside of the pipe section to the inside of the cooking utensil as long as the control flange does not rest on the rear front wall. Thus, separate holes are not needed.

A satisfactory indication of the pressure condition in the cooking utensil is guaranteed when the free shaft end of the indicator pin, which shaft end points into the environment, when the pressure indicator is relaxed, it is approximately flush with the front surface of the holding piece provided outside of the cooking utensil or projects over said surface. This assures that the shaft of the indicator pin is at all times supported at two points and is easily longitudinally movable in addition to the indicating function.

The inventive design of the pressure indicator allows the holding piece to be constructed in one piece and can consist especially of a rubber-elastic plastic. It can in this manner be manufactured by injection molding and particularly inexpensively.

As a whole the invention represents a remarkable simplification of the above-described conventional pressure indicators; a plurality of functions—start boiling, boiling, excess pressure safety, venting—can be carried out with a minimum of simple, economically manufacturable and mountable structural parts. The pressure indicator can be quickly and safely cleaned without any technical knowledge. Its volume visible outside of the cooking utensil is small, can be reduced to a narrow ring (of the fastening piece) enclosing the indicator pin and can therefore be designed inconspicuously and attractively.

BRIEF DESCRIPTION OF THE DRAWINGS

The invention will be discussed in greater detail hereinafter in connection with one exemplary embodiment and the drawings, in which:

FIGS. 1A, 1B and 1C illustrate a pressure indicator of the invention installed in a cooking utensil in a first embodiment in three partial FIGS. 1A to 1C—illustrating various operating stages—each one with a longitudinal cross-sectional front view and associated top and bottom views.

FIG. 2 illustrates the pressure indicator of FIG. 1, in a disassembled form.

Figures 3A, 3B, 3C:
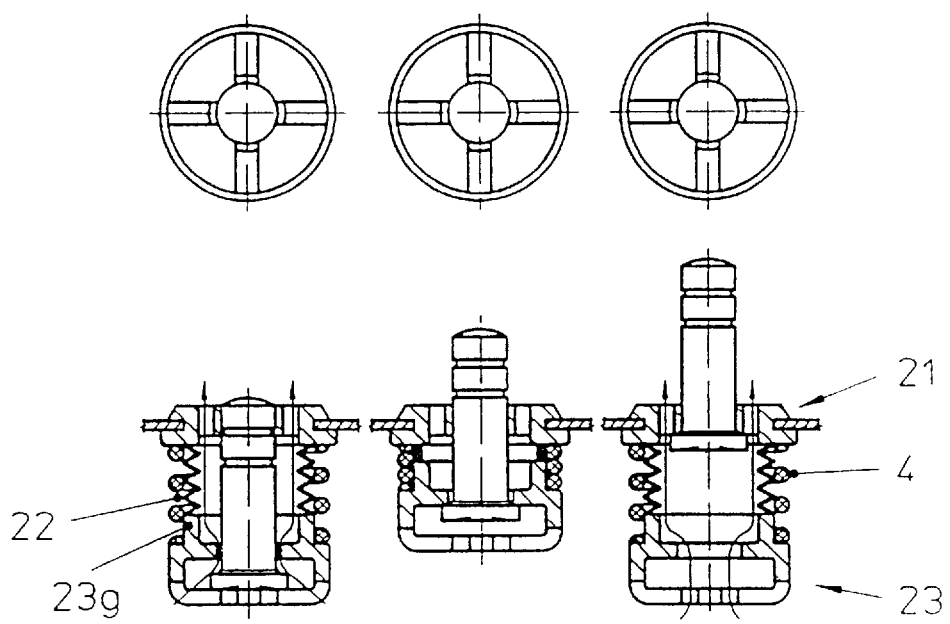
FIGS. 3A, 3B, and 3C and FIGS. 4A, 4B, and 4C respectively illustrate a second and a third embodiment of the pressure indicator in the same diagram illustration as in FIGS. 1A–1C.

Directional arrows clarify the flows of air or steam through the pressure indicator and their respective flow direction.

DETAILED DESCRIPTION

The pressure indicator of the invention consists in its first embodiment corresponding to FIGS. 1A, 1B, 1C, and 2 essentially of an indicator pin 1 and a holding piece 2. The indicator pin 1 is held during operation in a suitable, yet to be described manner in the holding piece 2. The holding piece 2 in turn is held stationarily in a utensil wall 3 of a cooking utensil consisting of a pot or the like and a lid lockable to said pot; the utensil wall 3 is indicated in the drawing.

It is common to provide the pressure indicator in the lid of the cooking utensil. The pressure indicator connects, with the lid being locked, flow path between the inside I of the cooking utensil to the environment U.

The circular-cylindrical indicator pin 1 is assembled in one piece having a shaft 11 and a control flange 12. The control flange 12 follows the shaft 11 with a slightly larger diameter and is arranged during operation on the side of the shaft 11 pointing to the inside I of the cooking utensil. Two grooves 11a in the shaft 11 clearly show the degree by which the indicator pin 1 projects over the utensil wall 3, which permits a reference to the operating state, in particular the pressure inside I of the cooking utensil. The arrangement is such that the free shaft end 11b of the shaft 11, which shaft end is directed opposite to the control flange 12, remains always also in the case of a pressureless cooking utensil, at least slightly, above the utensil wall 3.

The diametrically symmetrical holding piece 2 consists in one piece of a fastening piece 21 creating the connection to the utensil wall 3, a pipe section 22 projecting from the fastening piece 21 toward the inside I of the cooking utensil, which pipe section covers the shaft 11 of the indicator pin 1 and separates same from the inside I of the cooking utensil, and a front piece 23, which follows the pipe section 22 on its not facing the fastening piece 21 and spacially separating the inside 22a of the pipe section 22 from the inside I of the cooking utensil, and which front piece 23 encloses a control chamber 23a, in which the control flange 12 is provided during the control operation.

The fastening piece 21 consists in one piece of an annular collar flange 21a and a front wall 21b of the holding piece 2 facing the environment U, on which wall (FIG. 2) a first, outer stop Aa for the control flange 12 is constructed and defines the inside 22a of the pipe section 22 on one side. A circular groove-like annular groove 21d is provided on the outer periphery 21c of the fastening piece 21 in the collar flange 21a, which is pulled over the edge 31a of a hole 31 in the utensil wall 3, thus securely locking the entire holding piece 2 in this manner on the utensil wall 3.

It is understood that such a position connection can only be achieved with such a holding piece 2 when same consists of an elastic material; in particular a silicone rubber-like material is suited for this use. Such a connection is very strong during operation because also at a high pressure inside I of the cooking utensil only a small pressure directed outside of the cooking utensil is active on the holding piece 2 because the holding piece 2 has only small pressure-loaded surface due to the design of the invention. With an increasing pressure inside I of the cooking utensil, the sealing force in the area of the edge 31a increases when such a material is used so that a separate rubber-elastic seal is not needed. In order to ease feeding in of the collar flange 21a until engagement of the annular groove 21a with the edge 31a, a feed cone 21a is additionally formed on the fastening piece 21.

A center, first bearing bore 21f for the radial bearing of the shaft 11 of the indicator pin 1 is provided in the front wall 21b (FIG. 2). The side of the front wall 21b directed toward the inside 22a of the pipe section 22 is utilized for the outer stop Aa for the control flange 12. First steam-outlet openings 21g extend through the front wall 21 and fluidly connect the environment U to the inside 22a of the pipe section 22 and are closed off by the control flange 12 contacting the outer stop Aa. They are designed as a ring of through-bores axis-parallel to the longitudinal axis L, which ring is arranged on a disk coaxial with respect to the longitudinal axis L of the pressure indicator.

The coaxial pipe section 22, which is connected in one piece to the fastening piece 21 and projects into the inside I of the cooking utensil, is constructed as a corrugated pipe so that it can contract under the influence of the pressure on the inside I against the action of a restoring force F and can again expand under the action of the restoring force F. The restoring force F is here produced by the self-elasticity of the pipe section 22.

The front end of the pipe section 22 opposite the fastening piece 21 is closed off by the front piece 23 with a rear front wall 23b extending into the inside 22a of the pipe section 22.

The rear front wall 23b spacially separates the inside 22a of the pipe section from the control chamber 23a. The side of the rear front wall, which does not face the inside 22a, is utilized as an inner stop Ai for an annular flange surface 12a of the control flange 12, which annular flange surface follows the shaft 11 (FIG. 2).

A center, second bearing bore 23c for the shaft 11 of the indicator pin 1 is provided in the rear front wall 23b and is coaxial with respect to the longitudinal axis L. The indicator pin 1 is in this manner easily longitudinally movably securely supported. Between the bearing bore 23c and the shaft 11, there exists a bearing clearance of such a magnitude that an annular gap remains, which can be used as a second opening 23d, and which is sufficient for a fluid connection between the control chamber 23a and the inside 22a. The rear front wall 23b is sufficiently elastic so that it, assuming a suitable controlling force, can be overcome by the control flange 12 in both axial directions. Such a controlling force can be produced on the one hand by the pressure inside I of the cooking utensil so that the control flange 12 moves into the inside 22a, and on the other hand it can be manually applied in the opposite direction in order to either set back the indicator pin 1 so far that the control flange 12 is again in the control chamber 23a, or to lift the control flange 12 off from the inner stop Ai and to vent the cooking utensil.

The second opening 23d is blocked by the control flange 12 resting on the stop Ai; it is opened both during the mentioned manual adjusting of the indicator pin 1 and also during its automatic return in the direction toward the inside I, when the restoring force F exceeds the force of pressure occurring in the inside. This is, in particular, the case during the start of the operation where the pressure on the inside I is first built up. The closed cooking utensil is in this manner quickly vented at the start of being heated and is filled with steam before the pressure has risen so far that the control flange 12 rests on the inner stop Ai and fluidly separates the inside I from the environment U.

The control flange 12 rests on the stop Ai as long as the pressure on the inside I does not exceed a specified permissible operating pressure; the pipe section 22 remains unchanged during this time (this position of the indicator pin 1 is not shown in the drawing) or is more or less compressed without the control flange 12 being able to break through the rear front wall 23b. This occurs only when the pressure increases further to a non-permissible pressure.

A free end surface 12b (FIG. 2) of the control flange 12, which end surface does not face the shaft 22 and is directed opposite to the annular flange surface 12a, rests, with the inside I being without pressure or with low pressure during the start of cooking, on a stroke limiter 23e, which defines the control chamber 23a on its side opposite the rear front wall 23b. It can be recognized that the stroke limiter 23e is formed by four symmetrically arranged holding bars 23f, which on the one hand follow the pipe section 22 and on the other hand have a free end directed radially with respect to the longitudinal axis L. It is in this manner on the one hand possible to completely press the indicator pin 1 out of the holding piece 2, and on the other hand a constant fluid connection between the control chamber 23a and the inside I of the cooking utensil is guaranteed, independent of the position of the indicator pin 1.

The restoring force F in the embodiment of FIGS. 1A–1C and 2 is, as stated above, produced by the self-elasticity of the pipe section 22. However, it is moreover also possible that the restoring force F can be produced by a separate restoring spring 4, when same is also compressed during the contraction of the pipe piece 22.

Figures 4A, 4B, 4C:
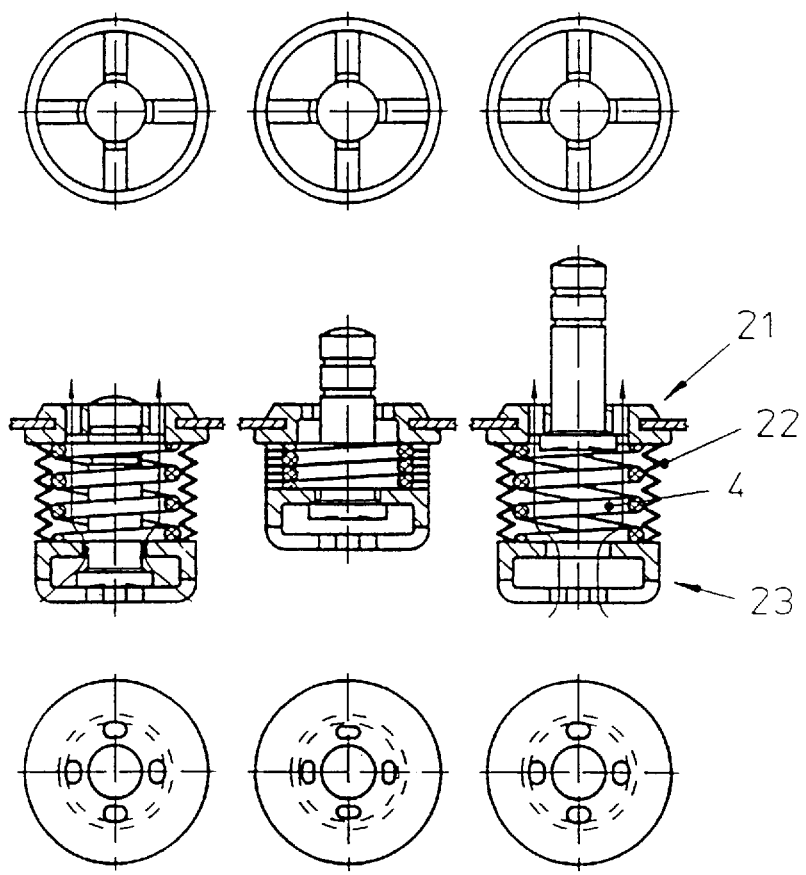

Such a restoring spring 4 is in the arrangement of FIGS. 3A–C provided concentrically on the outside, in FIGS. 4A–C concentrically within the pipe section 22, and is clamped between the fastening piece 21 and the front piece 23. It is thereby easily possible to take the restoring spring 4 already into consideration during the manufacture of the holding piece 2 so that same can continue to be designed in one piece.

A guide flange 23g is mounted on the front piece 23, in the embodiment according to FIGS. 3A–C, so that the one end of the restoring spring 4, which end is slipped over it, is radially guided. A similar guide flange can also be advantageous on the fastening piece 21.

The operation of the pressure indicator of the invention can essentially be taken from the above discussions. FIGS. 1A–C, 3A–C and 4A–C illustrate in the respective partial FIGS. A to C the respective most important operating states of the pressure indicator. The partial FIGS. 1A, 3A, and 4A correspond to the completely relieved device or the device working only against a slight pressure, for example, during the start of boiling, on the inside I of the cooking utensil: the indicator pin 1 rests with its control flange 12 on the stroke limiter 23e so that both openings 21g, 23d are not closed and the inside I is fluidly connected to the environment U. The cooking utensil can be opened in this operating state by unlocking the associated lid.

When the static pressure on the inside I increases, the flow pressure onto the end surface 12b of the control flange 12 increases also and moves said flange until its annular flange surface 12a rests on the inner stop Ai: the opening 23d is closed, the inside I is blocked off, and at an increased pressure the food in the cooking utensil is cooked to its finish. The pipe piece 22 can be compressed with a further increasing pressure, as this is illustrated in the partial FIGS. 1B, 3B, and 4B, in FIGS. 3B and 4B including the compression of the restoring spring 4. The shaft 11 projects now out of the fastening piece 21, its grooves 11a become more or less visible and the operator has an indication, if necessary, to throttle the energy supply to the cooking utensil.

Further increasing pressure on the inside I takes care that the control flange 12 is pressed through the rear front wall 23b, the control flange rests now with its annular flange surface 12a on the outer stop A, and the shaft 11 completely projects over the fastening piece 21. The bearing bore 23c is now completely open, and the occurring excess pressure is removed through the first openings 21g, which cannot be closed off by the control flange 12.

It is not possible to open the cooking utensil in the positions of the indicator pin 1 in the partial FIGS. 1B, 3B, and 4B and 1C, 3, and 4C. Rather a pressure relief must first be initiated for this purpose by manually moving the indicator pin 1 into its operating position illustrated in the partial Figures a or by the indicator pin reaching same automatically.

When the indicator pin 1 is moved manually still farther in direction of the inside I of the cooking utensil, the control flange 12 passes then the holding bars 23f through the stroke limiter 23e so that (FIG. 2) the indicator pin 1 is separated from the holding piece 2, for example, in order to clean the parts. It is reinserted in the opposite direction until its control flange 12 is inside of the control chamber 23a and the pressure indicator is again ready to operate.

I claim:

1. A pressure indicator for a cooking utensil that has an interior separate from the environment, comprising a hollow holding piece secured to the cooking utensil, an indicator pin arranged longitudinally movably in the holding piece, the holding piece including a fastening piece secured to the cooking utensil, the fastening piece having a first wall and a first opening in the first wall, a pipe section projecting from the fastening piece into the interior of the cooking utensil, and a front piece closing off the pipe section, a portion of the front piece having a second wall and a second opening in the second wall, the indicator pin including a shaft and a control flange, the indicator pin being movable between first, second and third positions, an interior facing surface of the first wall defining an outer stop against which the control flange contacts to hold the indicator pin within the holding piece in the third position, the indicator pin being supported in the second opening in the first and second positions, an interior facing surface on a side of the second wall remote from said first wall defining an inner stop against which the control flange contacts to seal the interior of the cooking utensil from the environment in the second position, the second wall being elastic and yields in both directions to the control flange (1) to vent the interior of the cooking utensil when a pressure limit is exceeded by allowing the indicator pin to move from the second position to the third position and (2) to allow the indicator pin to be reset into one of the first and second positions after the pressure falls beneath the exceeded pressure limit, and a further portion of said front piece additionally including a stroke limiter for limiting travel of the control flange into the interior of the cooking utensil with the control flange being oriented on a side of said second wall remote from said first wall, the pipe section being longitudinally elastic and being dimensioned so as to oppose axial shortening thereof with a deforming resistance acting as a restoring force and with said indicator pin in the second position.

2. The pressure indicator according to claim 1, wherein the pipe section coaxially surrounds the indicator pin and has corrugated sides.

3. The pressure indicator according to claim 1, wherein a restoring spring is clamped between the fastening piece and the front piece.

4. The pressure indicator according to claim 3, wherein the restoring spring is coaxial to the pipe section.

5. The pressure indicator according to claim 3, wherein the restoring spring is positioned outside the pipe section.

6. The pressure indicator according claim 3, wherein the restoring spring is provided in the pipe section.

7. The pressure indicator according to claim 3, wherein a guide flange for the restoring spring is provided on at least one of the fastening piece and the front piece.

8. The pressure indicator according to claim 3, wherein the restoring spring is a circular-cylindrical metallic coil spring.

9. The pressure indicator according to claim 1, wherein the fastening piece is elastic, and an annular, radially outward opening groove is recessed into an outer periphery of the fastening piece, the annular groove receiving therein an edge of a hole in the cooking utensil.

10. The pressure indicator according to claim 1, wherein the first wall includes a disk, a plurality of through bores are distributed on the disk, and the through bores are arranged so that a fluid connection between inside the pipe piece and the environment is maintained with the control flange resting on the outer stop in the third position.

11. The pressure indicator according to claim 1, wherein the stroke limiter for the indicator pin is connected to the pipe section, the front piece has a control chamber defined between the second wall and the stroke limiter.

12. The pressure indicator according to claim 11, wherein the stroke limiter has several holding bars distributed and connected on the periphery of the pipe section, the holding bars being adapted to be contacted by the control flange to hold the indicator pin within the holding piece.

13. The pressure indicator according to claim 12, wherein the holding bars extend radially with respect to the longitudinal axis of the pressure indicator and end freely.

14. The pressure indicator according to claim 1, wherein the diameter of the shaft is less than the diameter of the second opening, a bearing clearance between the shaft and second opening fluidly connects an inside of the pipe section to an interior of the cooking utensil with the second wall free from contacting the control flange.

15. The pressure indicator according to claim 1, wherein the holding piece has a front surface remote from the pipe section adjacent a surface of the cooking utensil, a free shaft end of the indicator pin extending into environment outwardly of the cooking utensil is, with the pressure indicator being relaxed in the first position, at least one of (a) approximately flush with the front surface of the holding piece provided outside of the cooking utensil and (b) outside the front surface.

16. The pressure indicator according to claim 1, wherein the holding piece is a single piece.

17. The pressure indicator according to claim 1, wherein the holding piece comprises a rubber-elastic plastic piece.

18. A pressure indicator for a cooking utensil having a hole in a wall thereof, the cooking utensil wall separating an interior thereof from the environment, comprising:

a holding piece having (1) a hollow interior, (2) a fastening portion securing the holding piece to the wall in the cooking utensil hole, (3) an elastic collapsible pipe section secured to the fastening portion and being movable between collapsed and expanded positions, the pipe section extending into the interior of the cooking utensil and having an interior end, and (4) an internal portion at the interior end, the fastening portion including an outer stop wall, the internal portion including an elastic, inner stop wall, the outer stop and inner stop walls having openings therein and are spaced from each other, the internal portion having a stroke limiter thereon spaced from the inner stop wall on a side remote from outer stop wall;

a pressure indicator shaft longitudinally slidably received in the holding piece interior and the openings, the indicator shaft having a pressure indicating end and a control flange extending radially therefrom longitudinally remote from the pressure indicating end;

the control flange resting on the stroke limiter in a low pressure state of the cooking vessel, the control flange abutting the inner stop wall in an operating pressure range of the cooking utensil and sealing the inner stop wall opening so as to fluidly seal the interior of the cooking utensil from the environment, and the pipe section having a restoring force resisting collapse thereof, the pipe section collapsing due to increased pressure within the cooking utensil overcoming the restoring force, and the control flange passing through the inner stop wall opening upon the pressure within the cooking utensil exceeding an upper limit of the operating pressure range to abut the outer stop wall, the outer stop wall opening being open to the environment so that the pressure within the cooking utensil is relieved through the internal portion, inner stop wall opening, and outer stop wall opening.

* * * * *

UNITED STATES PATENT AND TRADEMARK OFFICE
CERTIFICATE OF CORRECTION

PATENT NO. : 5 850 778
DATED : December 22, 1998
INVENTOR(S) : Wolfgang FISCHBACH It is certified that error appears in the above-identified patent and that said Letters Patent is hereby corrected as shown below:

On the title page: Item [73]Assignee's" should read

---Heinrich Baumgarten KG Spezialfabrik fuer Beschlagteile---.

Signed and Sealed this

Seventeenth Day of August, 1999

Attest:

Q. TODD DICKINSON

*Attesting Officer*  *Acting Commissioner of Patents and Trademarks*